United States Patent
Imbrenda et al.

(10) Patent No.: US 12,411,719 B2
(45) Date of Patent: Sep. 9, 2025

(54) DEFERRED RECLAIMING OF SECURE GUEST RESOURCES

(71) Applicant: INTERNATIONAL BUSINESS MACHINES CORPORATION, Armonk, NY (US)

(72) Inventors: Claudio Imbrenda, Boeblingen (DE); Christian Borntraeger, Stuttgart (DE); Janosch Andreas Frank, Stuttgart (DE); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 534 days.

(21) Appl. No.: 17/394,642

(22) Filed: Aug. 5, 2021

(65) Prior Publication Data

US 2023/0039894 A1    Feb. 9, 2023

(51) Int. Cl.
*G06F 9/50* (2006.01)
*G06F 9/455* (2018.01)
*G06F 21/70* (2013.01)

(52) U.S. Cl.
CPC ........ *G06F 9/5077* (2013.01); *G06F 9/45558* (2013.01); *G06F 21/70* (2013.01);
(Continued)

(58) Field of Classification Search
None
See application file for complete search history.

(56) References Cited

U.S. PATENT DOCUMENTS 6,223,256 B1 * 4/2001 Gaither ................ G06F 12/127
711/134
8,578,006 B2 11/2013 Sobel et al.
(Continued)

FOREIGN PATENT DOCUMENTS

CN    101410818 A    4/2009
CN    103430159 A    12/2013
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Wynuel S Aquino
(74) *Attorney, Agent, or Firm* — Edward Wixted, Esq.; Kevin P. Radigan, Esq.; Heslin Rothenberg Farley & Mesiti P.C.

(57) ABSTRACT

Deferred reclaiming of secure guest resources within a computing environment is provided, which includes initiating, by a host of the computing environment, removal of a secure guest from the computing environment, while leaving one or more resources of the secure guest to be reclaimed asynchronous to the removal of the secure guest. The deferring also includes reclaiming the one or more secure guest resources asynchronous to the removal of the secure guest, where the one or more secure guest resources are available for reuse as the one or more secure guest resources are reclaimed asynchronous to the removal of the secure guest.

22 Claims, 9 Drawing Sheets

(52) U.S. Cl.
CPC .............. *G06F 2009/45587* (2013.01); *G06F 2221/2141* (2013.01); *G06F 2221/2143* (2013.01)

(56) References Cited

U.S. PATENT DOCUMENTS

| | | | |
|---|---|---|---|
| 8,943,260 | B2 | 1/2015 | Ben-Yehuda et al. |
| 9,280,458 | B2 | 3/2016 | Durrant |
| 9,323,552 | B1 | 4/2016 | Adogla et al. |
| 9,454,451 | B2 | 9/2016 | Campbell |
| 9,507,540 | B1 | 11/2016 | Adogla et al. |
| 9,600,362 | B2 | 3/2017 | Kang et al. |
| 9,798,482 | B1 | 10/2017 | Tsirkin et al. |
| 10,474,359 | B1 | 11/2019 | Volpe et al. |
| 10,956,216 | B2 | 3/2021 | van Riel et al. |
| 11,467,864 | B2 | 10/2022 | Zu et al. |
| 11,669,441 | B1* | 6/2023 | Adogla ............... G06F 12/1441 711/170 |
| 2005/0235045 | A1 | 10/2005 | Narayanaswami et al. |
| 2018/0124163 | A1* | 5/2018 | Abali .................. H04L 41/0806 |
| 2018/0314632 | A1* | 11/2018 | Krishnamurthy ..... G06F 3/0608 |
| 2018/0374072 | A1* | 12/2018 | Zhao ........................ G06Q 20/00 |
| 2020/0225972 | A1* | 7/2020 | Karunaratne ....... G06F 9/45558 |
| 2020/0259640 | A1* | 8/2020 | Leavy .................. H04L 9/0841 |
| 2020/0409740 | A1* | 12/2020 | Li ........................... G06F 21/53 |
| 2021/0064546 | A1* | 3/2021 | Zmudzinski ........ G06F 12/1063 |
| 2021/0096895 | A1* | 4/2021 | Reid .................... H04L 63/0428 |
| 2021/0234681 | A1 | 7/2021 | Buendgen et al. |
| 2022/0318042 | A1* | 10/2022 | Davis .................... G06F 9/5016 |

FOREIGN PATENT DOCUMENTS

| | | |
|---|---|---|
| CN | 103620559 A | 3/2014 |
| CN | 103870332 A | 6/2014 |
| CN | 106503547 A | 3/2017 |
| CN | 117751352 A | 3/2024 |
| DE | 112022003818 T5 | 5/2024 |
| GB | 2624593 A | 5/2024 |
| JP | 2024-530593 A | 8/2024 |
| TW | 202021328 A | 6/2020 |
| TW | I840804 B | 2/2023 |
| WO | 2023/012655 A1 | 2/2023 |

OTHER PUBLICATIONS

IBM Publication, "z/Architecture Principles of Operation," IBM® Publication No. SA22-7832-12, 13th Edition, Sep. 2019 (pp. 1-2000).
PCT/IB2022/057151, International Search Report & Written Opinion, dated Oct. 26, 2022 (6 pages) (Year: 2022).

* cited by examiner

INITIATE, BY A HOST OF THE COMPUTING ENVIRONMENT, REMOVAL OF A SECURE GUEST FROM THE COMPUTING ENVIRONMENT, WHILE LEAVING ONE OR MORE SECURE GUEST RESOURCES OF THE SECURE GUEST TO BE RECLAIMED ASYNCHRONOUS TO THE REMOVAL OF THE SECURE GUEST —— 700

RECLAIM THE ONE OR MORE SECURE GUEST RESOURCES ASYNCHRONOUS TO REMOVAL OF THE SECURE GUEST, WHERE THE ONE OR MORE SECURE GUEST RESOURCES ARE AVAILABLE FOR REUSE AS THE ONE OR MORE SECURE GUEST RESOURCES ARE RECLAIMED, ASYNCHRONOUS TO THE REMOVAL OF THE SECURE GUEST —— 702

WHERE RECLAIMING THE ONE OR MORE SECURE GUEST RESOURCES OF THE SECURE GUEST OCCURS AFTER, AND ASYNCHRONOUS TO, REMOVAL OF THE SECURE GUEST —— 704

WHERE REMOVAL OF THE SECURE GUEST INCLUDES RECLAIMING OF ONE OR MORE OTHER SECURE GUEST RESOURCES COEXTENSIVE WITH REMOVAL OF THE SECURE GUEST, WHILE LEAVING THE ONE OR MORE SECURE GUEST RESOURCES OF THE SECURE GUEST TO BE RECLAIMED ASYNCHRONOUSLY —— 706

WHERE THE ONE OR MORE SECURE GUEST RESOURCES INCLUDE GUEST MEMORY ASSOCIATED WITH THE SECURE GUEST —— 708

FIG. 7A

```
┌─────────────────────────────────────────────────────────────────────┐
│  ┌───────────────────────────────────────────────────────────────┐  │
│  │ FURTHER INCLUDING SPECIFYING, BY THE HOST, THE ONE OR MORE    │  │
│  │ SECURE GUEST RESOURCES OF THE SECURE GUEST TO BE RECLAIMED    │  │
│  │ ASYNCHRONOUS TO REMOVAL OF THE SECURE GUEST ～710              │  │
│  └───────────────────────────────────────────────────────────────┘  │
│                                                                     │
│  ┌───────────────────────────────────────────────────────────────┐  │
│  │ WHERE THE RECLAIMING INCLUDES DETERMINING THAT THE ONE OR     │  │
│  │ MORE SECURE GUEST RESOURCES ARE IN A DISCARDED STATE AND,     │  │
│  │ BASED ON THE ONE OR MORE SECURE GUEST RESOURCES BEING IN      │  │
│  │ THE DISCARDED STATE, CLEARING THE ONE OR MORE SECURE GUEST    │  │
│  │ RESOURCES FOR REUSE, THE CLEARING OCCURRING AFTER REMOVAL     │  │
│  │ OF THE SECURE GUEST ～712                                      │  │
│  └───────────────────────────────────────────────────────────────┘  │
│                                                                     │
│  ┌───────────────────────────────────────────────────────────────┐  │
│  │ WHERE THE ONE OR MORE SECURE GUEST RESOURCES INCLUDE ONE OR   │  │
│  │ MORE SECURE MEMORY PAGES, AND THE DETERMINING INCLUDES        │  │
│  │ CHECKING PAGE METADATA TO CONFIRM THAT A SECURE MEMORY PAGE   │  │
│  │ OF THE ONE OR MORE SECURE MEMORY PAGES IS IN THE DISCARDED    │  │
│  │ STATE ～714                                                    │  │
│  └───────────────────────────────────────────────────────────────┘  │
│                                                                     │
│  ┌───────────────────────────────────────────────────────────────┐  │
│  │ WHERE THE RECLAIMING INCLUDES CLEARING THE ONE OR MORE        │  │
│  │ SECURE MEMORY PAGES, AND CLEARING ONE OR MORE SECURITY        │  │
│  │ FLAGS ASSOCIATED WITH THE ONE OR MORE SECURE MEMORY           │  │
│  │ PAGES ～716                                                    │  │
│  └───────────────────────────────────────────────────────────────┘  │
│                                                                     │
│  ┌───────────────────────────────────────────────────────────────┐  │
│  │ WHERE THE INITIATING INCLUDES SENDING, BY THE HOST, A         │  │
│  │ REQUEST TO A SECURE PLATFORM OF THE COMPUTING ENVIRONMENT     │  │
│  │ TO REMOVE THE SECURE GUEST, WHILE LEAVING THE ONE OR MORE     │  │
│  │ SECURE GUEST RESOURCES OF THE SECURE GUEST TO BE RECLAIMED    │  │
│  │ ASYNCHRONOUS TO REMOVAL OF THE SECURE GUEST ～718              │  │
│  └───────────────────────────────────────────────────────────────┘  │
└─────────────────────────────────────────────────────────────────────┘

FIG. 7B
```

DEFERRED RECLAIMING OF SECURE GUEST RESOURCES

BACKGROUND

One or more aspects relate, in general, to facilitating processing within a computing environment, and in particular, to improving such processing.

Certain computing environments can support virtualization, in which a hypervisor or virtual machine manager of the computing environment hosts various guests, such as virtual machines or virtual servers of the computing environment. A virtual machine has access to system resources and can execute an operating system, such as a guest operating system. Different guests can be owned by different owners, and of these guests, some can be secure guests.

A traditional hypervisor, or host, has full control over the hosted guests. In particular, the hypervisor has the capability to inspect and even modify memory of the hosted guest. However, a secure guest is a guest that can be hosted by a hypervisor that is not fully trustworthy. The image of such a secure guest would be protected when loaded and the protection of the contents of the resources assigned to the guest (e.g., memory, CPU registers) would be maintained throughout the lifetime of the guest. The protection of the guest includes at least integrity protection (e.g., hypervisor cannot maliciously change any guest states) and in addition can include maintaining the confidentiality of the initial image, code and data running in the secure guest.

SUMMARY

Certain shortcomings of the prior art are overcome, and additional advantages are provided through the provision of a computer program product for facilitating processing within a computing environment. The computer program product includes at least one computer-readable storage medium having program instructions embodied therewith. The program instructions are readable by a processing circuit to cause the processing circuit to perform a method. The method includes initiating, by a host of the computing environment, removal of a secure guest from the computing environment, while leaving one or more secure guest resources of the secure guest to be reclaimed asynchronous to the removal of the secure guest. Further, the method includes reclaiming the one or more secure guest resources asynchronous to removal of the secure guest, wherein the one or more secure guest resources are available for use as the one or more secure guest resources are reclaimed asynchronous to the removal of the secure guest. Advantageously, the method provides faster removal of secure guests from the computing environment, especially for secure guests within the computing environment with a large amount of resources. Also, secure guest resources are available for reuse as the one or more secure guest resources are reclaimed asynchronous to the removal of the secure guest, which advantageously lowers memory pressure within the computing environment.

In one or more embodiments, reclaiming the one or more secure guest resources of the secure guest occurs after, and asynchronous to, removal of the secure guest. By deferring reclaiming of one or more secure guest resources, the method provides faster removal of a secure guest from the computing environment.

In one or more embodiments, removal of the secure guest includes reclaiming one or more other secure guest resources coextensive with removal of the secure guest, while leaving the one or more secure guest resources of the secure guest to be reclaimed asynchronously. Advantageously, in one implementation, the memory associated with a secure guest (i.e., secure virtual machine) can be reclaimed asynchronously, while in another implementation, a portion of the memory associated with the secure guest can be reclaimed coextensive with removal of the secure guest, leaving a remainder of the memory of the secure guest to be reclaimed asynchronously. In another embodiment, the one or more secure guest resources include guest memory associated with the secure guest.

In one embodiment, the method further includes specifying, by the host, the one or more secure guest resources of the secure guest to be reclaimed asynchronous to removal of the secure guest.

In one or more implementations, the reclaiming includes determining that the one or more secure guest resources are in a discarded state and, based on the one or more secure guest resources being in the discarded state, clearing the one or more secure guest resources for reuse, where the clearing occurs after removal of the secure guest. In this manner, discarded secure guest resources can be freed faster. For instance, there is no need to check whether a memory owner is in the correct state to allow the secure memory to be removed or cleared. Further, the process results in lower contention in that memory can be reclaimed in parallel.

In one embodiment, the one or more secure guest resources include one or more secure memory pages, and the determining includes checking page metadata to confirm that a secure memory page of the one or more secure memory pages is in the discarded state. Further, in one implementation, the reclaiming includes clearing the one or more secure memory pages, and clearing one or more security flags associated with the one or more secure memory pages.

In one or more embodiments, the initiating includes sending, by the host, a request to a secure platform of the secure computing environment to remove the secure guest, while leaving the one or more secure guest resources of the secure guest to be reclaimed asynchronous to removal of the secure guest.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7B depict one example of facilitating processing within a computing environment, in accordance with one or more aspects of the present invention;

DETAILED DESCRIPTION

Figure 1:
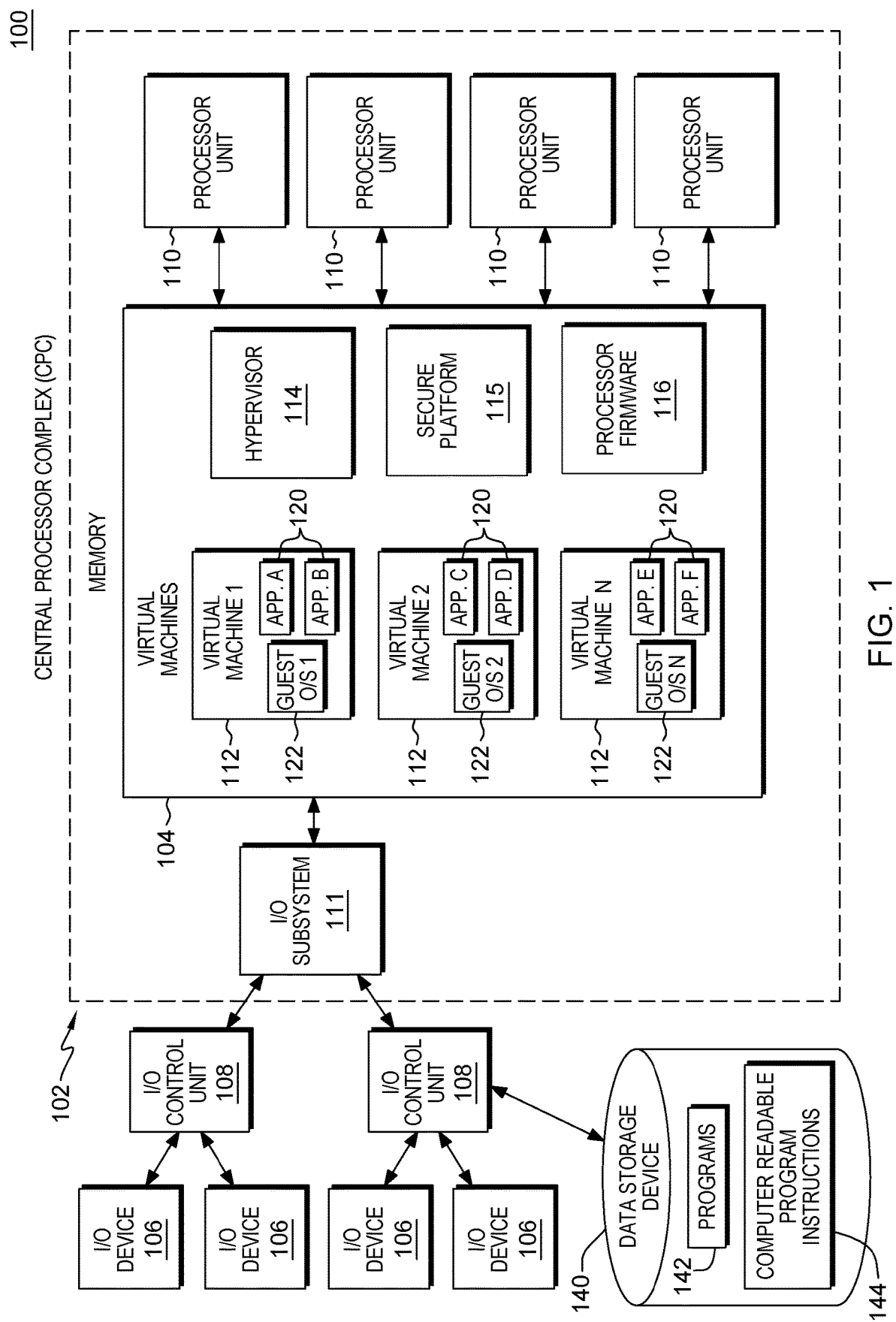
FIG. 1 depicts one example of a computing environment to incorporate and use one or more aspects of the present invention.

In accordance with one or more aspects of the present invention, a capability is provided to facilitate processing within a computing environment. As an example, the capability includes providing a deferred reclaiming of secure guest resources of a secure guest (i.e., secure virtual machine) being removed within the computing environment. In one example, the deferred reclaiming includes initiating, by a host of the computing environment, removal of a secure guest from the computing environment, while leaving one or more secure guest resources of the secure guest to be reclaimed asynchronous to the removal of the secure guest. Then, the host reclaims the one or more secure guest resources asynchronous to the removal of the secure guest, with the secure guest resources being available for reuse as they are reclaimed. In a further example, the reclaiming of the one or more secure guest resources occurs after, and asynchronous to, removal of the secure guest. In another example, the removal of the secure guest includes reclaiming one or more other secure guest resources coextensive with removal of the secure guest, while leaving the one or more secure guest resources of the secure guest to be reclaimed asynchronously. In one example, the secure guest resources include guest memory associated with the secure guest. In a further example, the host system specifies the one or more secure guest resources of the secure guest to be reclaimed asynchronous to removal of the secure guest. In certain embodiments, the reclaiming includes determining that the one or more secure guest resources are in a discarded state and, based on the one or more secure guest resources being in the discarded state, clearing the one or more secure guest resources for reuse, where the clearing occurs after removal of the secure guest. In another example, the one or more secure guest resources include one or more secure memory pages in the discarded state, and the determining includes checking page metadata to confirm that a secure memory page of the one or more secure memory pages is in the discarded state. In one example, the reclaiming includes clearing the one or more secure memory pages, and clearing one or more security flags associated with the one or more secure memory.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities can include and/or use one or more aspects of the present invention. z/Architecture and IBM are trademarks or registered trademarks of International Business Machines Corporation in at least one jurisdiction.

Referring to FIG. 1, in one example, a computing environment 100 includes a central processor complex (CPC) 102. Central processor complex 102 is, for instance, an IBM Z® server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices can be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that can be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a secure platform 115 (also referred to as an ultravisor or trusted execution environment) and processor firmware 116. One example of hypervisor 114 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

In one or more embodiments, secure platform 115 can be implemented, at least in part, in hardware and/or firmware configured to perform, for instance, processes such as described herein. The secure platform is trusted firmware and/or hardware that makes use of memory-protection hardware to enforce memory protection. The owner of a guest can securely pass information (using, e.g., IBM Secure Execution) to the secure platform, or trusted execution environment, by using a public host key, which is embedded in a host key document. To process the confidential information, the secure platform 115, or trusted execution environment, uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines 112 (or guests), each capable of operating with different programs 120 and running a guest operating system 122, such as the Linux® operating system. Each virtual machine 112 is capable of functioning as a separate system. That is, each virtual machine can be independently removed or reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a world-wide basis.

Figure 2:
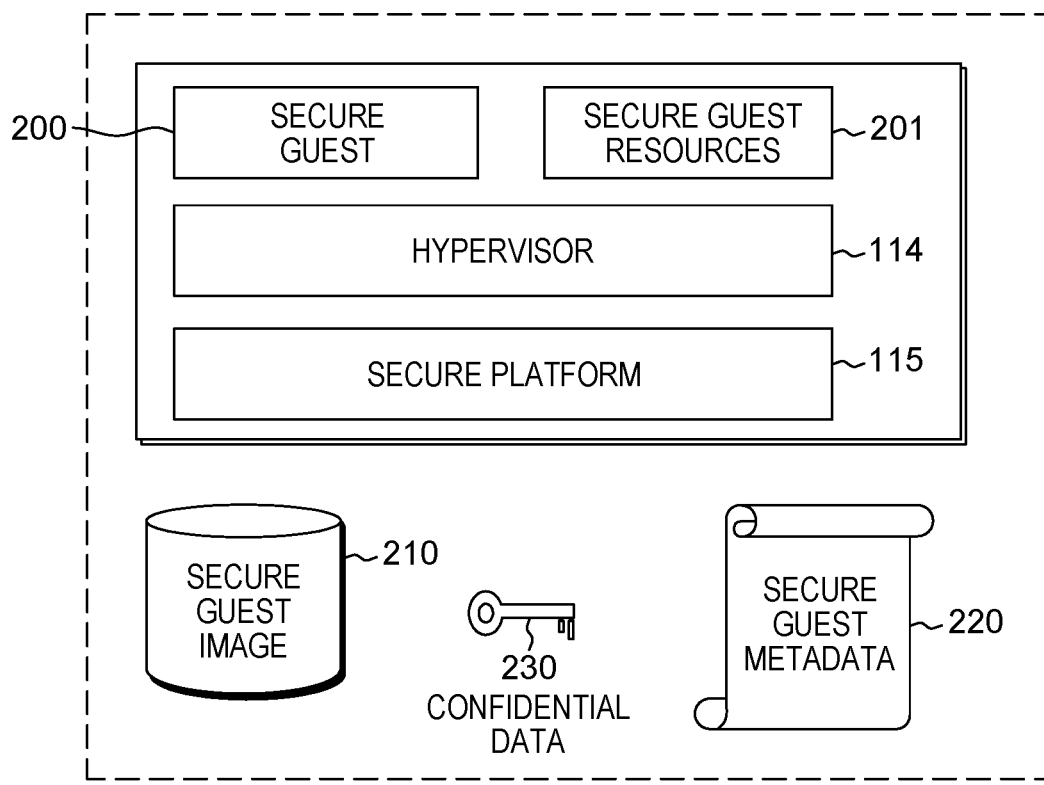
FIG. 2 depicts one example of a secure guest and secure guest resources, with confidential data being included in the secure guest, in accordance with one or more aspects of the present invention.

In one embodiment, one or more virtual machines or guests 112 are secure guests. Referring to FIG. 2, a secure guest 200 is started by a hypervisor (e.g., hypervisor 114) in a manner that the hypervisor cannot observe the secure guest resources 201, including the state (e.g., memory, registers, etc.) of the secure guest. For instance, in one embodiment of confidential computing, the hypervisor can start/stop a secure guest, and the hypervisor knows where data used to start the secure guest is located but it cannot look into the running secure guest. Data used to load/start the secure guest can be encrypted in a manner that the hypervisor cannot see the secure guest. The owner of the secure guest image places confidential data in the secure guest metadata and then generates a secure guest image together with the secure guest metadata. After the secure guest is loaded, any interaction with the state of the secure guest is processed by a trusted execution environment, such as secure platform 115.

In one embodiment, to start a secure guest, the hypervisor passes a secure guest image 210 and secure guest metadata 220 to secure platform 115. The metadata is integrity and at least partially confidentially protected and is only interpreted by the secure platform. Based on the information in the secure guest metadata, the secure platform can then enforce the integrity of the secure guest image loaded into memory, protect the memory of the secure guest containing the loaded image from being accessible by the hypervisor and potentially decrypt the secure guest image before starting the secure guest.

After the secure guest is loaded, it may be desirable to supply the secure guest with user-specific confidential data 230 (e.g., keys to perform encryption or establish a secure connection, passwords, etc.). For instance, in one embodiment, the confidentially protected part of the metadata of the secure guest (e.g., secure guest metadata 220) can be extended to contain the confidential data (e.g., confidential data 230; e.g., user-specific confidential data that is loadable in the secure guest). In one example, the metadata of the secure guest can be extended to contain the confidential data together with one or more identifiers of the confidential data. Other possibilities also exist.

As noted, secure guests (or secure virtual machines) are a type of virtual machine where the hardware and firmware of the computing environment denies access to the state of the secure guest (i.e., secure virtual machine), except for special memory areas that the secure guest actively designates as shared. Such a secure guest cannot be accessed by the host system (or hypervisor), or the administrator of the computing environment (e.g., of the operating system that hosts the virtual machine, which would normally be possible). Access to the secure guest state means that an attacker on the host system would be able to read sensitive information, such as encryption keys or other confidential information or documents, from the virtual machine memory, which would be a security risk. Additionally, a secure guest cannot be attacked by other virtual machines in the computing environment that manage to avoid the host security.

As noted, in a computing environment including secure guests (i.e., secure virtual machines), it can be assumed that the host or hypervisor is not to be trusted, as well as other guests (whether normal guests or secure guests) within the computing environment. A secure platform (e.g., ultravisor or trusted execution environment) can be used as described, where the secure platform is trusted by the secure guest, as well as by the hypervisor. In addition, a secure guest trusts itself in implementation.

Conventionally, when a secure guest is removed from a computing environment, all resources associated with the secure guest are cleared or freed coextensively, which can take a long time depending on the amount of resources.

In accordance with one or more aspects, a computer program product, computer system and computer-implemented method are provided, which facilitate processing within a computing environment by allowing for a faster and more efficient, asynchronous reclaiming of resources in a system where secure guests (i.e., secure virtual machines) are used. The resources, such as guest memory, other memory and/or other resources, of the secure guest, stay protected after the secure guest has been deleted or removed, in order to enhance the guest removal process by eliminating the need to coextensively handle all the secure guest resources. For instance, one or more secure guest resources (such as guest memory) can be reclaimed later, asynchronous to the removal of the secure guest.

Figure 3:
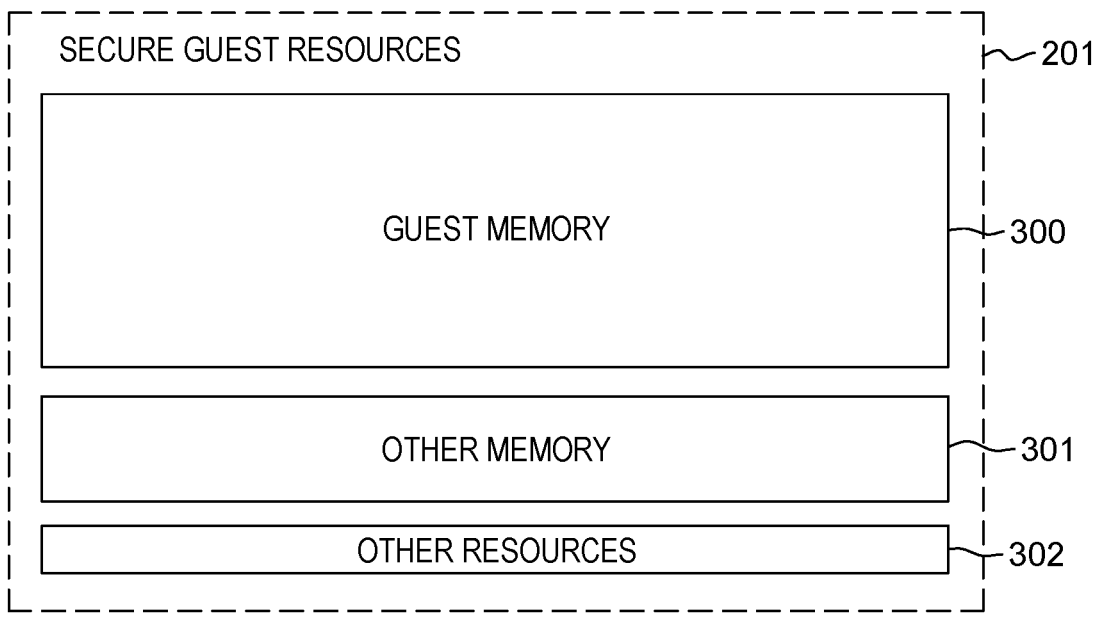
FIG. 3 is a block diagram representation of one embodiment of secure guest resources utilized by a secure guest of a computing environment, in accordance with one or more aspects of the present invention.

FIG. 3 illustrates one embodiment of secure guest resources 201 required for a secure guest (or secure virtual machine) within a computing environment, such as described herein. As illustrated, secure guest resources 201 include, in one or more embodiments, associated guest memory 300, as well as other memory 301, and other resources 302 used to support the secure guest. Other memory 301 is typically a smaller amount of memory than guest memory 300, and on certain computing environment implementations, can be a percentage of the associated guest memory 300. By way of example, other memory 301 can be, or include, memory owned by the secure platform to maintain the state of the secure guest. Other resources 302 are typically a small amount of resources needed to support the secure guest, and can include, for instance, a secure or unique machine token, a cached secure state, translation lookaside buffer (TLB) entries, reserved I/O devices, etc.

When a guest (or virtual machine) is to be removed or disposed of from the computing environment, its associated resources, such as memory, need to be reclaimed, for instance, by the host, in order to be reused. In the case of a secure guest, there are a variety of memory areas that can be associated with the secure guest other than the guest memory 300 itself. Those memory areas, such as other memory 301 and/or other resources 302, also need to be cleared (i.e., if protection is based on access control) and then made available for normal use. Advantageously, in accordance with one or more aspects disclosed herein, one or more of the secure guest resources associated with the secure guest being removed are left to be reclaimed asynchronous to the removal of the secure guest. In this way, removal of the secure guest is significantly faster than where all secure guest resources are coextensively cleared or erased in order to confirm removal of the secure guest. In this manner, the remaining secure guest resources can be reclaimed at a later time, that is, asynchronous to the removal of the secure guest.

Figure 4:
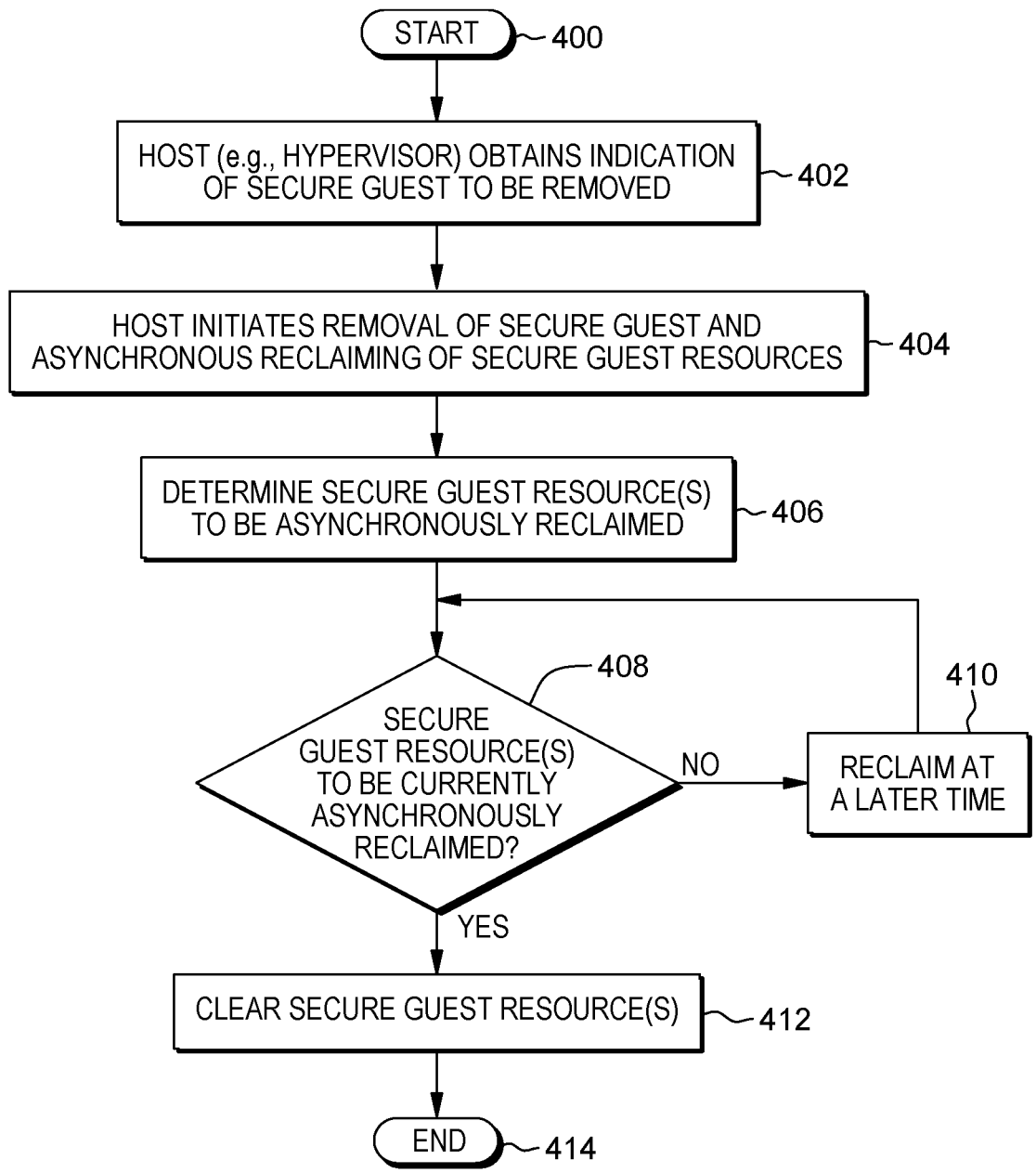
FIG. 4 depicts one embodiment of a workflow illustrating certain aspects of one or more embodiments of the present invention.

FIG. 4 depicts one embodiment of a workflow illustrating one or more aspects of this. As understood by one skilled in the art, the illustrated workflow can be embodied by program code implemented, for instance, in association with the host and the secure platform (or trusted execution environment). Program code starts 400 with the host (or hypervisor) obtaining an indication of a secure guest to be removed 402. The host initiates removal of the secure guest, and asynchronous reclaiming of one or more of the secure guest resources 404. In one implementation, the host calls an application program interface of the secure platform to remove the secure guest. Where the interface allows, the host can optionally specify which secure guest resources are to be reclaimed asynchronously.

As illustrated in FIG. 4, program code determines that there are secure guest resources to be asynchronously reclaimed 406, and ascertains whether one or more of the secure guest resources to be asynchronously reclaimed are to be currently reclaimed 408. For instance, in one implementation, the host can reclaim in background processing the secure guest resources deferred for reclaiming after removal of the secure guest. If resources are not to be currently reclaimed, they are reclaimed at a later time 410. Otherwise, the secure guest resources to be reclaimed are cleared 412 (e.g., set to a predefined value), which completes the process 414. In comparison, in a traditional workflow, the host would call the secure guest interface to initiate removal of a secure guest, and clearing of all secure guest resources coextensive with removal of the secure guest, in order for the host to then be free to reuse the resources. In the process described herein, the host requests (or calls an interface) to clear the secure guest resources that should be cleared coextensively, and removes the secure guest. The secure guest resources to be cleared coextensively can include all, or some of, other resources 302 (FIG. 3), such as a secure token and reserved I/O devices. The host can then reclaim the remaining secure guest resources asynchronously, and as the resources (e.g., memory) are reclaimed, the resources are available for immediate use.

In accordance with one or more aspects disclosed herein, the host initiates a call or request to the secure platform (e.g., trusted execution environment or ultravisor) to dispose or remove a secure guest or virtual machine without immediately releasing all of the secure guest resources (e.g., all of the secure guest memory). The remaining secure guest resources can then be reclaimed asynchronously to the removal of the secure guest. Note that not all secure guest memory needs to be reclaimed asynchronously. For instance, in one implementation, all guest memory associated with the secure guest can be reclaimed asynchronous to removal of the secure guest, while in another implementation, only a part of the guest memory need be reclaimed asynchronous to the removal of the secure guest. Multiple variations and embodiments are possible.

In one or more implementations, to facilitate reclaiming resources, such as secure memory resources, a new resource state (e.g., memory state), referred to herein as a discarded state, can be used. Generally, secure memory is not accessible by a host, as explained. Secure memory can belong to a secure guest, or to the secure platform. A discarded state (as discussed herein) can be implemented by updating the metadata of the area of the secure memory that needs to be discarded, to mark it as discarded state, meaning that it does not belong to the secure platform, or to any secure guest, and can be reclaimed freely. Discarded memory can then be reclaimed at any time, including asynchronously and/or concurrently, since there is no need to perform additional checks. Further, changing metadata associated with a secure memory area allows the memory to be reclaimed freely. For instance, there is no need to check which secure guest the memory belongs to, and there is no need to change security properties of a secure memory area, which would require longer processing time.

Figure 5:
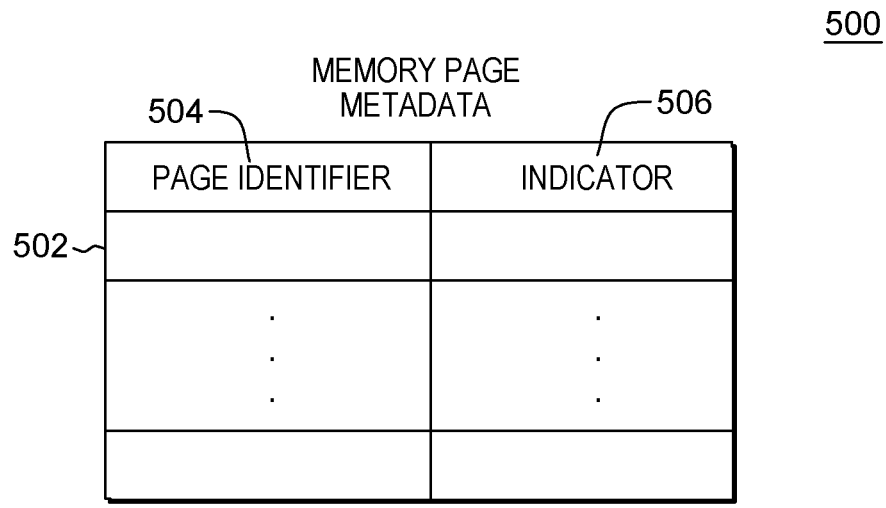
FIG. 5 depicts one example of memory page metadata used in accordance with one or more aspects of the present invention.

By way of example, each secure memory page includes metadata, with one example of a memory page metadata data structure 500 being depicted in FIG. 5. In one example, the memory page metadata is accessible by the secure platform 115 (FIGS. 1 & 2), and includes, for instance, one or more entries 502, with each entry 502 including, for instance, a page identifier 504 and one or more indicators 506, such as a discarded state indicator described herein. The memory page metadata can be used by the host and secure platform during reclaiming of secure memory pages associated with a removed secure guest. As explained, secure memory that is no longer needed can be placed into the discarded state. When a secure virtual machine or guest is removed, the memory page metadata is updated, and subsequently referenced to determine whether the particular memory page is in discarded state. Further, in the case of memory hot-plugging or hot-unplugging, memory page metadata with a discarded state indicator can also be used. In this manner, discarded memory remains secure, and needs to be reclaimed explicitly before being usable. The operation, such as remove secure guest, or a memory hot-unplug, that puts the memory pages at issue in discarded state, can therefore proceed faster.

Figure 6:
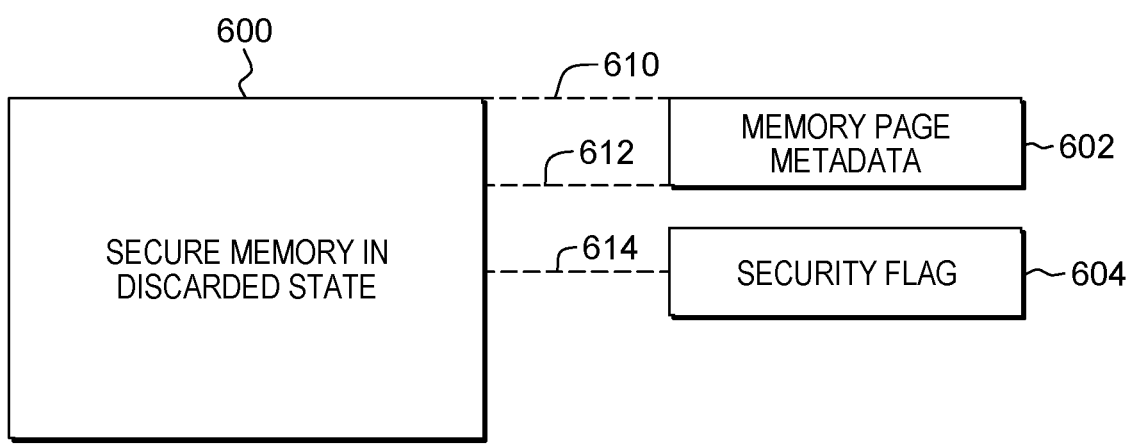
FIG. 6 is a block diagram representation of another workflow illustrating certain aspects of one or more embodiments of the present invention.

By way of example, FIG. 6 illustrates one embodiment of the process for asynchronously reclaiming secure memory in discarded state. As illustrated in FIG. 6, in addition to secure memory in discarded state 600, there is associated memory metadata 602, such as the memory page metadata described above, as well as one or more security flags 604 used in securing the memory. The process includes program code checking the memory page metadata to confirm that the page is in discarded state 610, and assuming so, the memory page is cleared 612 (if required), followed by clearing of the one or more security flags 614. This process compares favorably with a conventional process for reclaiming a memory page which can include, for instance, checking if the secure guest is in a state that allows memory to be reclaimed, which can be a slow process by itself and include, for instance, additional lookup steps to find the guest or virtual machine associated with the memory, potentially require additional locks for synchronization, and additional checks. Advantageously, using a discarded state metadata indicator such as described herein allows discarded secure memory to be freed faster, with less processing. There is no need to check if the owner, such as the secure guest, is in the correct state to allow the associated memory to be removed or cleared, and there is lower contention in that the memory in discarded state can be reclaimed in parallel. The process simply requires determining that secure memory, such as a secure memory page, has associated herewith a discarded state indication, and if so, then the memory page can be reclaimed by, for instance, clearing the memory, resulting in the memory being immediately available for reuse.

In another embodiment, once secure memory is in discarded state, a fast memory import into another secure guest can be performed. The fast memory import means that the secure indication is not changed, and hence processing is sped up by not needing locking and/or flushing steps to change the indication. The actual memory contents of the secure memory in discarded state are simply cleared before the memory is given to another secure guest. With such an embodiment, a pool of secure discarded memory pages can be managed in the operating system, which only become normal memory pages when the operating system reboots (i.e., when the secure guest's hypervisor reboots). Should a secure guest require memory, it can be provided from the pool of the secure discarded memory pages rather than requiring processing to make normal memory secure. This is thus another type of reclaiming from that described above, where the deferred state memory page contents are cleared, as well as the security indication which protects against any unsecure access to the secure memory page.

Further details of one embodiment of facilitating processing within a computing environment, as it relates to one or more aspects of the present invention, are described with reference to FIGS. 7A-7B.

Referring to FIG. 7A, in one embodiment, a host system of a computing environment initiates removal of a secure guest from the computing environment, while leaving one or more secure guest resources of the secure guest to be reclaimed asynchronous to the removal of the secure guest 700. The one or more secure guest resources are then reclaimed asynchronous to the removal of the secure guest, where the one or more secure guest resources are available for reuse as the one or more secure guest resources are reclaimed asynchronous to the removal of the secure guest 702. By deferring reclaiming of the one or more secure guest resources, secure guests can be removed faster from the computing environment, especially secure guests with large secure guest resources. Also, secure guest resources are available for reuse as the one or more secure guest resources are reclaimed asynchronous to the removal of the secure guest, which can advantageously lower memory pressure within the computing environment.

In one embodiment, reclaiming the one or more secure guest resources of the secure guest occurs after, and asynchronous to, removal of the secure guest 704.

In one embodiment, removal of the secure guest includes reclaiming of one or more other secure guest resources coextensive with removal of the secure guest, while leaving the one or more secure guest resources of the secure guest to be reclaimed asynchronous 706.

In one embodiment, the one or more secure guest resources include guest memory associated with the secure guest 708.

In one example, the method further includes specifying, by the host, the one or more secure guest resources of the secure guest to be reclaimed asynchronous to removal of the secure guest 710.

Referring to FIG. 7B, in one embodiment, the reclaiming includes determining that the one or more secure guest resources are in a discarded state, and based on the one or more secure guests being in the discarded state, clearing the one or more guest resources for reuse, where the clearing occurs after removal of the secure guest 712. In this manner, discarded memory can be freed faster, as there is no need to check whether the memory owner in the computing environment is in the correct state to allow memory to be removed or cleared. Further, contention is lowered, as memory can be reclaimed in parallel.

In one embodiment, the one or more secure guest resources include one or more secure memory pages, and the determining includes checking page metadata to confirm that a secure memory page of the one or more secure memory pages is in the discarded state 714. In one embodiment, the reclaiming includes clearing the one or more secure memory pages, and clearing one or more security flags associated with the one or more secure memory pages 716.

In one example, the initiating includes sending, by the host, a request to a secure platform of the computing environment to remove the secure guest, while leaving the one or more secure guest resources of the secure guest to be reclaimed asynchronous to removal of the secure guest 718.

Other variations and embodiments are possible.

Figure 8A:
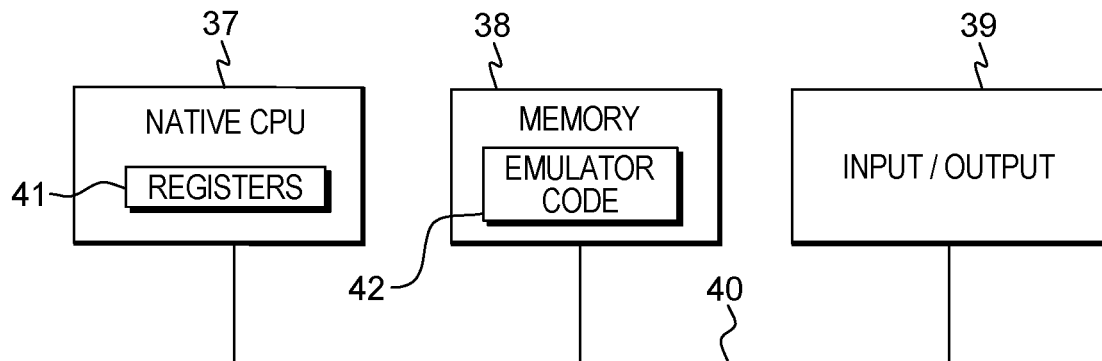
FIG. 8A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 8A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 8B:
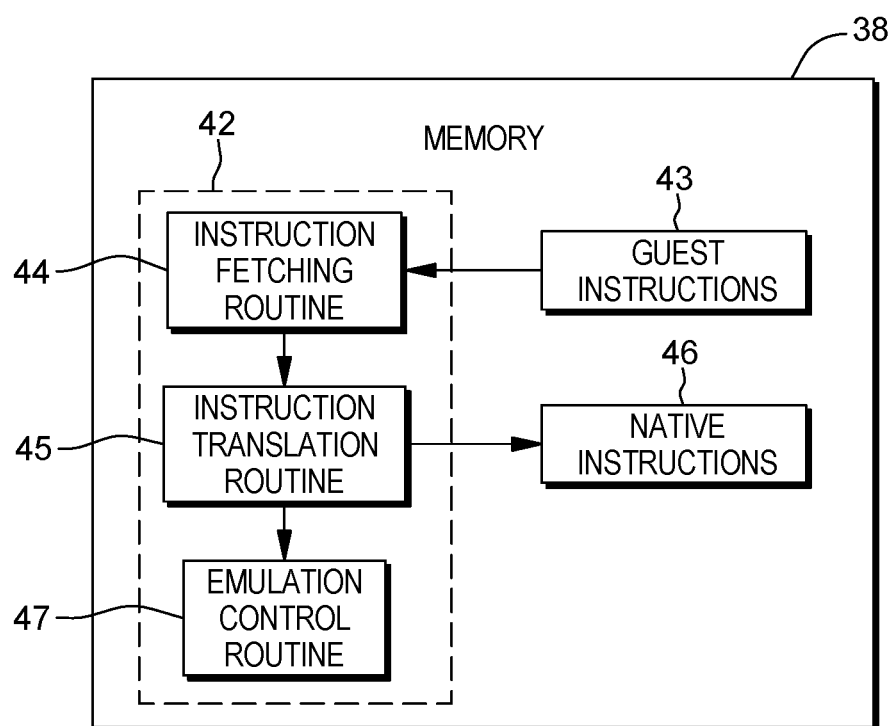
FIG. 8B depicts further details of the memory of FIG. 8A, in accordance with one or more aspects of the present invention.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction, command or call that may be emulated includes the trusted execution environment call described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
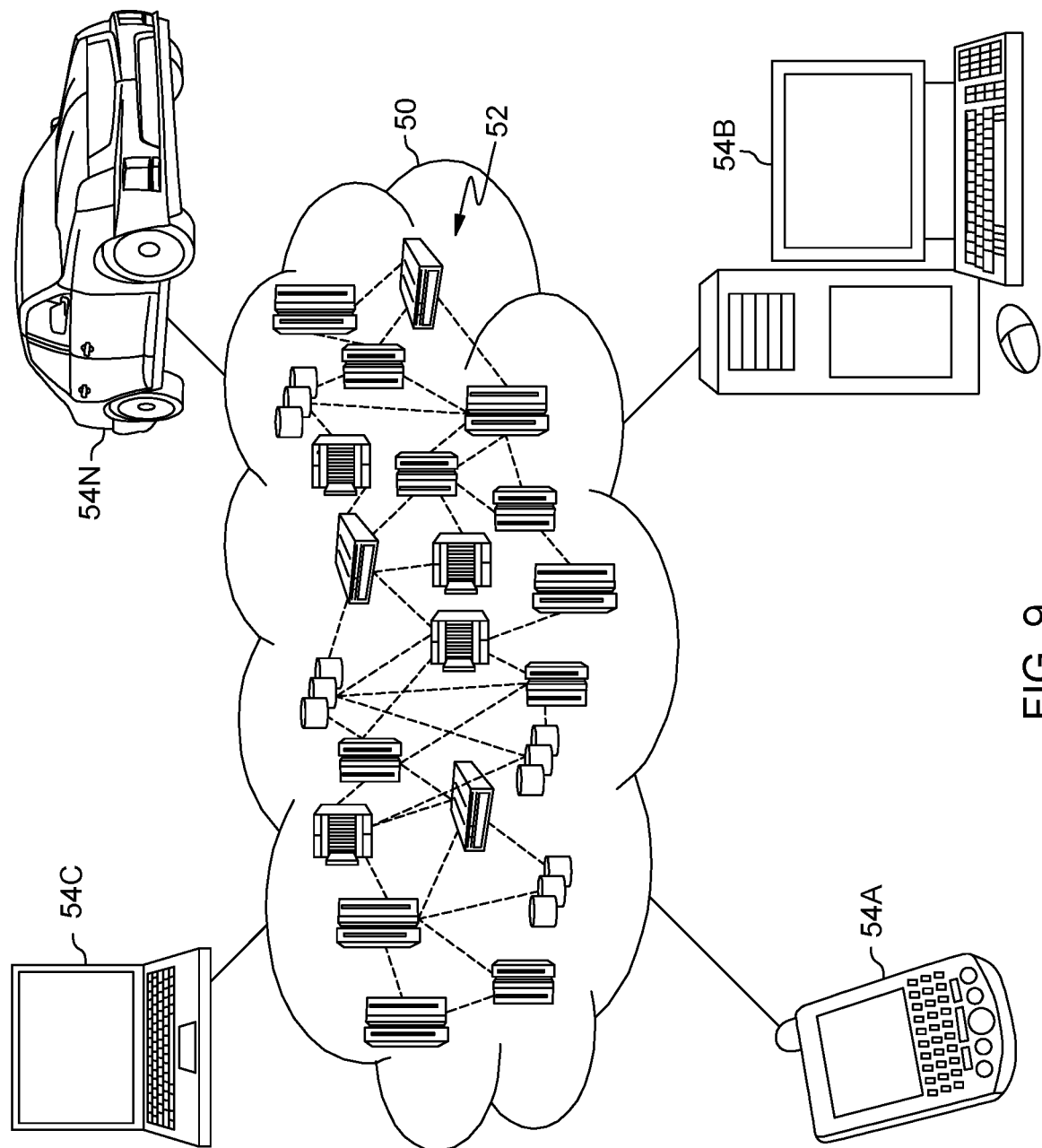
FIG. 9 depicts one embodiment of a cloud computing environment, in accordance with one or more aspects of the present invention.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 10:
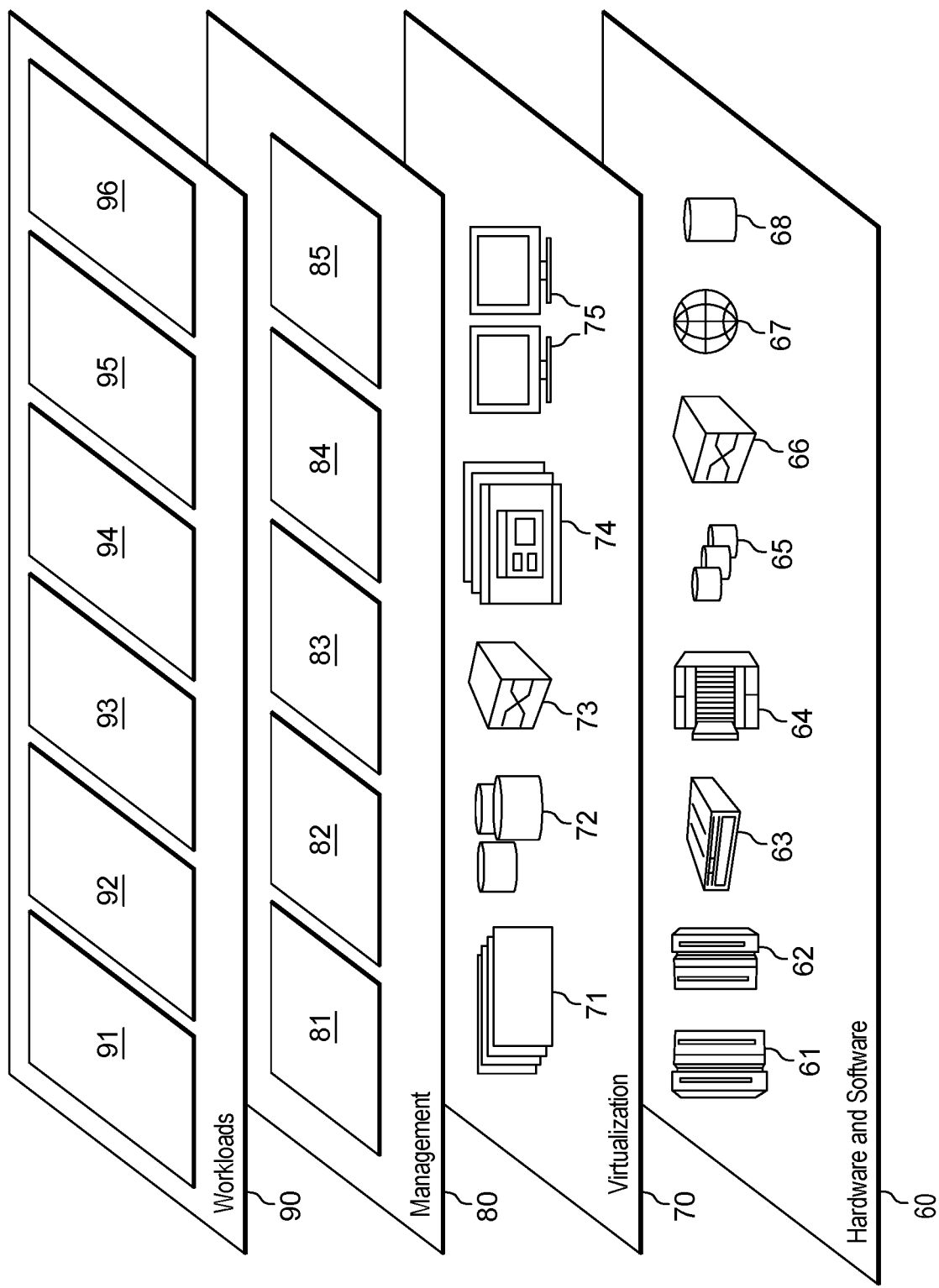
FIG. 10 depicts one example of abstraction model layers, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and provision of deferred reclaiming of secure guest resources processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Additionally, different types of structures may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer-readable storage medium having program instructions embodied therewith, the program instructions being readable by a processing circuit to cause the processing circuit to perform a method comprising:
        initiating, by a host of the computing environment, starting of a secure guest within the computing environment, the initiating comprising sending a secure guest image and secure guest metadata to a secure platform of the computing environment separate from the host for use in starting the secure guest using one or more secure guest resources that are indicated inaccessible by the host via the secure guest metadata;
        initiating, by the host of the computing environment, removal of the secure guest from the computing environment and reclaiming of secure guest resources, including leaving one or more secure guest resources of the secure guest to be reclaimed by the host asynchronous to the removal of the secure guest by the secure platform, wherein interaction with a state of the secure guest is to be processed by the secure platform of the computing environment, the secure platform being trusted by the secure guest and by the host, and wherein the initiating comprises sending, by the host, a request to the secure platform to remove the secure guest and change state metadata associated with the one or more secure guest resources of the secure guest to indicate that the one or more secure guest resources are in a discarded state, the discarded state allowing the one or more secure guest resources to be reclaimed by the host asynchronous to removal of the secure guest by the secure platform; and
        reclaiming, by the host subsequent to the initiating removal of the secure guest, the one or more secure guest resources in the discarded state asynchronous to removal of the secure guest, the reclaiming including determining, by the host, that the state metadata associated with the one or more secure guest resources is in the discarded state and, based on the state metadata of the one or more secure guest resources being in the discarded state, clearing by the host the one or more secure guest resources for reuse, wherein the one or more secure guest resources are available for reuse as the one or more secure guest resources are reclaimed asynchronous to the removal of the secure guest by the secure platform.

2. The computer program product of claim 1, wherein reclaiming the one or more secure guest resources of the secure guest occurs after, and asynchronous to, removal of the secure guest.

3. The computer program product of claim 1, wherein removal of the secure guest includes reclaiming of one or more other secure guest resources coextensive with removal of the secure guest, while leaving the one or more secure guest resources of the secure guest to be reclaimed asynchronously.

4. The computer program product of claim 1, wherein the one or more secure guest resources comprise guest memory associated with the secure guest.

5. The computer program product of claim 1, further comprising specifying, by the host, the one or more secure guest resources of the secure guest to be reclaimed asynchronous to removal of the secure guest.

6. The computer program product of claim 1, wherein the one or more secure guest resources comprise one or more secure memory pages, and the determining comprises checking page metadata to confirm that a secure memory page of the one or more secure memory pages is in the discarded state prior to clearing by the host the secure memory page for reuse.

7. The computer program product of claim 6, further comprising clearing one or more security flags associated with the one or more secure memory pages based on clearing by the host the one or more secure memory pages.

8. The computer program product of claim 1, wherein the host comprises a hypervisor of the computing environment, and the secure platform is separate from the hypervisor.

9. A computer system for facilitating processing within a computing environment, the computer system comprising:
  a memory; and
  at least one processor in communication with the memory, wherein the computer system is configured to perform a method, the method comprising:
    initiating, by a host of the computing environment, starting of a secure guest within the computing environment, the initiating comprising sending a secure guest image and secure guest metadata to a secure platform of the computing environment separate from the host for use in starting the secure guest using one or more secure guest resources that are indicated inaccessible by the host via the secure guest metadata;
    initiating, by the host of the computing environment, removal of the secure guest from the computing environment and reclaiming of secure guest resources, including leaving one or more secure guest resources of the secure guest to be reclaimed by the host asynchronous to the removal of the secure guest by the secure platform, wherein interaction with a state of the secure guest is to be processed by the secure platform of the computing environment, the secure platform being trusted by the secure guest and by the host, and wherein the initiating comprises sending, by the host, a request to the secure platform to remove the secure guest and change state metadata associated with the one or more secure guest resources of the secure guest to indicate that the one or more secure guest resources are in a discarded state, the discarded state allowing the one or more secure guest resources to be reclaimed by the host asynchronous to removal of the secure guest by the secure platform; and
    reclaiming, by the host subsequent to the initiating removal of the secure guest, the one or more secure guest resources in the discarded state asynchronous to removal of the secure guest, the reclaiming including determining, by the host, that the state metadata associated with the one or more secure guest resources is in the discarded state and, based on the state metadata of the one or more secure guest resources being in the discarded state, clearing by the host the one or more secure guest resources for reuse, wherein the one or more secure guest resources are available for reuse as the one or more secure guest resources are reclaimed asynchronous to the removal of the secure guest by the secure platform.

10. The computer system of claim 9, wherein reclaiming the one or more secure guest resources of the secure guest occurs after, and asynchronous to, removal of the secure guest.

11. The computer system of claim 9, wherein removal of the secure guest includes reclaiming of one or more other secure guest resources coextensive with removal of the secure guest, while leaving the one or more secure guest resources of the secure guest to be reclaimed asynchronously.

12. The computer system of claim 9, wherein the one or more secure guest resources comprise guest memory associated with the secure guest.

13. The computer system of claim 9, further comprising specifying, by the host, the one or more secure guest resources of the secure guest to be reclaimed asynchronous to removal of the secure guest.

14. The computer system of claim 9, wherein the one or more secure guest resources comprise one or more secure memory pages, and the determining comprises checking page metadata to confirm that a secure memory page of the one or more secure memory pages is in the discarded state prior to clearing by the host the secure memory page for reuse.

15. The computer system of claim 14, further comprising clearing one or more security flags associated with the one or more secure memory pages based on clearing by the host the one or more secure memory pages.

16. The computer system of claim 9, wherein the host comprises a hypervisor of the computing environment, and the secure platform is separate from the hypervisor.

17. A computer-implemented method for facilitating processing within a computing environment, the computer-implemented method comprising:
  initiating, by a host of the computing environment, starting of a secure guest within the computing environment, the initiating comprising sending a secure guest image and secure guest metadata to a secure platform of the computing environment separate from the host for use in starting the secure guest using one or more secure guest resources that are indicated inaccessible by the host via the secure guest metadata;
  initiating, by the host of the computing environment, removal of the secure guest from the computing environment and reclaiming of secure guest resources, including leaving one or more secure guest resources of the secure guest to be reclaimed by the host asynchronous to the removal of the secure guest by the secure platform, wherein interaction with a state of the secure guest is to be processed by the secure platform of the computing environment, the secure platform being trusted by the secure guest and by the host, and wherein the initiating comprises sending, by the host, a request to the secure platform to remove the secure guest and change state metadata associated with the one or more secure guest resources of the secure guest to indicate that the one or more secure guest resources are in a discarded state, the discarded state allowing the one or more secure guest resources to be reclaimed by the host asynchronous to removal of the secure guest by the secure platform; and reclaiming, by the host subsequent to the initiating removal of the secure guest, the one or more secure guest resources in the discarded state asynchronous to removal of the secure guest, the reclaiming including determining, by the host, that the state metadata associated with the one or more secure guest resources is in the discarded state and, based on the state metadata of the one or more secure guest resources being in the discarded state, clearing by the host the one or more secure guest resources for reuse, wherein the one or more secure guest resources are available for reuse as the one or more secure guest resources are reclaimed asynchronous to the removal of the secure guest by the secure platform.

18. The computer-implemented method of claim 17, wherein reclaiming the one or more secure guest resources of the secure guest occurs after, and asynchronous to, removal of the secure guest.

19. The computer-implemented method of claim 17, wherein removal of the secure guest includes reclaiming of one or more other secure guest resources coextensive with removal of the secure guest, while leaving the one or more secure guest resources of the secure guest to be reclaimed asynchronously.

20. The computer-implemented method of claim 17, wherein the host comprises a hypervisor of the computing environment, and the secure platform is separate from the hypervisor.

21. The computer-implemented method of claim 20, wherein the one or more secure guest resources comprise one or more secure memory pages, and the determining comprises checking page metadata to confirm that a secure memory page of the one or more secure memory pages is in the discarded state prior to clearing by the host the secure memory page for reuse.

22. The computer-implemented method of claim 21, further comprising clearing one or more security flags associated with the one or more secure memory pages based on clearing by the host the one or more secure memory pages.

\* \* \* \* \*